United States Patent
Harris

(10) Patent No.: US 8,522,346 B1
(45) Date of Patent: *Aug. 27, 2013

(54) PROTECTION AGAINST UNINTENTIONAL FILE CHANGING

(76) Inventor: Scott C. Harris, Rancho Santa Fe, CA (US)

( * ) Notice: Subject to any disclaimer, the term of this patent is extended or adjusted under 35 U.S.C. 154(b) by 1526 days.

This patent is subject to a terminal disclaimer.

(21) Appl. No.: 11/841,875

(22) Filed: Aug. 20, 2007

Related U.S. Application Data

(60) Continuation of application No. 11/682,307, filed on Mar. 5, 2007, now Pat. No. 7,788,702, which is a division of application No. 09/755,452, filed on Jan. 5, 2001, now Pat. No. 7,231,050.

(60) Provisional application No. 60/219,919, filed on Jul. 21, 2000.

(51) Int. Cl.
*G08B 23/00* (2006.01)

(52) U.S. Cl.
USPC .......................................................... 726/23

(58) Field of Classification Search
USPC .......................................................... 726/23
See application file for complete search history.

(56) References Cited

U.S. PATENT DOCUMENTS

| | | | |
|---|---|---|---|
| 5,163,147 A | 11/1992 | Orita | |
| 5,652,876 A * | 7/1997 | Ashe et al. | 703/26 |
| 5,745,669 A * | 4/1998 | Hugard et al. | 714/3 |
| 6,049,671 A | 4/2000 | Slivka | |
| 6,377,952 B1 * | 4/2002 | Inohara et al. | 1/1 |
| 6,463,537 B1 | 10/2002 | Tello | |
| 6,662,186 B1 * | 12/2003 | Esquibel et al. | 1/1 |
| 6,675,299 B2 | 1/2004 | Porter | |
| 6,789,195 B1 | 9/2004 | Prihoda | |
| 6,820,063 B1 | 11/2004 | England | |
| 7,152,116 B1 * | 12/2006 | Austin et al. | 709/245 |
| 7,231,050 B1 * | 6/2007 | Harris | 380/286 |
| 7,788,702 B1 * | 8/2010 | Harris | 726/2 |
| 2001/0044901 A1 * | 11/2001 | Grawrock | 713/189 |
| 2002/0152228 A1 * | 10/2002 | Lopez et al. | 707/202 |
| 2004/0093506 A1 * | 5/2004 | Grawrock et al. | 713/189 |

* cited by examiner

*Primary Examiner* — Kambiz Zand
*Assistant Examiner* — Aubrey Wyszynski

(57) ABSTRACT

Files are protected against intrusion by badly behaving programs. An embodiment may define a file association between a kind of file on an operating system, and a program which normally opens that kind of file. An operation is detected whereby another file attempts to change the file association. When that happens, a recommendation is provided to a user of whether the user should change the file association and allow said different program to open the file. One embodiment may determine if there is another program which is masquerading as said file-associated program and prevent the masquerading program from opening the file.

14 Claims, 4 Drawing Sheets

PROTECTION AGAINST UNINTENTIONAL FILE CHANGING

CROSS REFERENCE TO RELATED APPLICATIONS

This application is a divisional of U.S. application Ser. No. 09/755,452 filed Jan. 5, 2001 and claims the benefit of the U.S. Provisional Application No. 60/219,919, filed on Jul. 19, 2000.

BACKGROUND

Files in a personal computer or other computer are often changed without the user's consent. Many of these changes, in fact, are not desired by the user.

A first set of such undesired changes may include viruses and other similar programs which can infect a user's computer and make changes to the user's computer. These changes can be in many different forms. A destructive virus, for example, may delete files from a computer, either all files or just some of the files. Less destructive viruses may do less intrusive things. Some viruses change file associations.

Like a virus, many application installation programs may also change file associations. This is especially prevalent in music playing programs such as MP3 players. Each file that is installed and is capable of playing a program may change the association. The user is often not given a choice.

Privacy can be compromised through hiding files on the user's personal computer. For example, one of the original types of viruses was the Trojan virus in which a file is stored on the personal computer. That file may cause the personal computer to do certain things, such as acquire information about what the user is doing. Trojans are often simply used for annoyance. However, snooper programs or Spyware programs; may be even more prevalent; these programs may be actuated on the computer by either another program, or by some party claiming to have authority.

For example, an employer may place a snooper program to watch what an employee does during working hours. A spouse may place a snooper program that watches what the other spouse does on the computer when the spouse is not around. Finally, certain programs such as GetRight™ and the like may place snooper programs (often called "AdWare") that monitor the user's actions, and report back for demographic purposes.

These programs are often very sneaky. They find and monitor information about what the user is doing, and store it in a special file on the computer. The monitoring object, e.g., a person, can either obtain that file over the network, or can actually sit down at the computer and obtain the file.

It is very difficult to guard against such a privacy violation. A user who has intimate knowledge of computer workings may be able to guard against such an intrusion. However, the makers of such programs often stay a step ahead of any way of guarding against them.

SUMMARY

The present application teaches a system of protecting files on a computer against unintended changes.

According to one aspect, files and file types are grouped according to the functions they play in the computer. Groupings may include system files, i.e., those files which operate the operating system and the like, pointing files, which are changed during operation of the computer to indicate something that is currently occurring in the computer, and data files which represents the individual data that a user stores. These files can be protected against unintended changes.

Another aspect uses multiple criteria to decide how to continue if a questionable operation has occurred. The multiple criteria can be scored and tallied to allow an automated, but informed decision to be made, instead of relying on chance and/or the user's possibly limited knowledge.

Yet another aspect defines a system of monitoring access to files. Certain files are protected in specified ways in order to prevent certain information about the computer from being obtained.

In an embodiment, the system protects a file domain. Files that are within the domain are handled in a way which prevents them from being read without a specified password.

BRIEF DESCRIPTION OF THE DRAWINGS

These and other aspects will now be described in detail with reference to the accompanying drawings, wherein.

DETAILED DESCRIPTION

Figure 1:
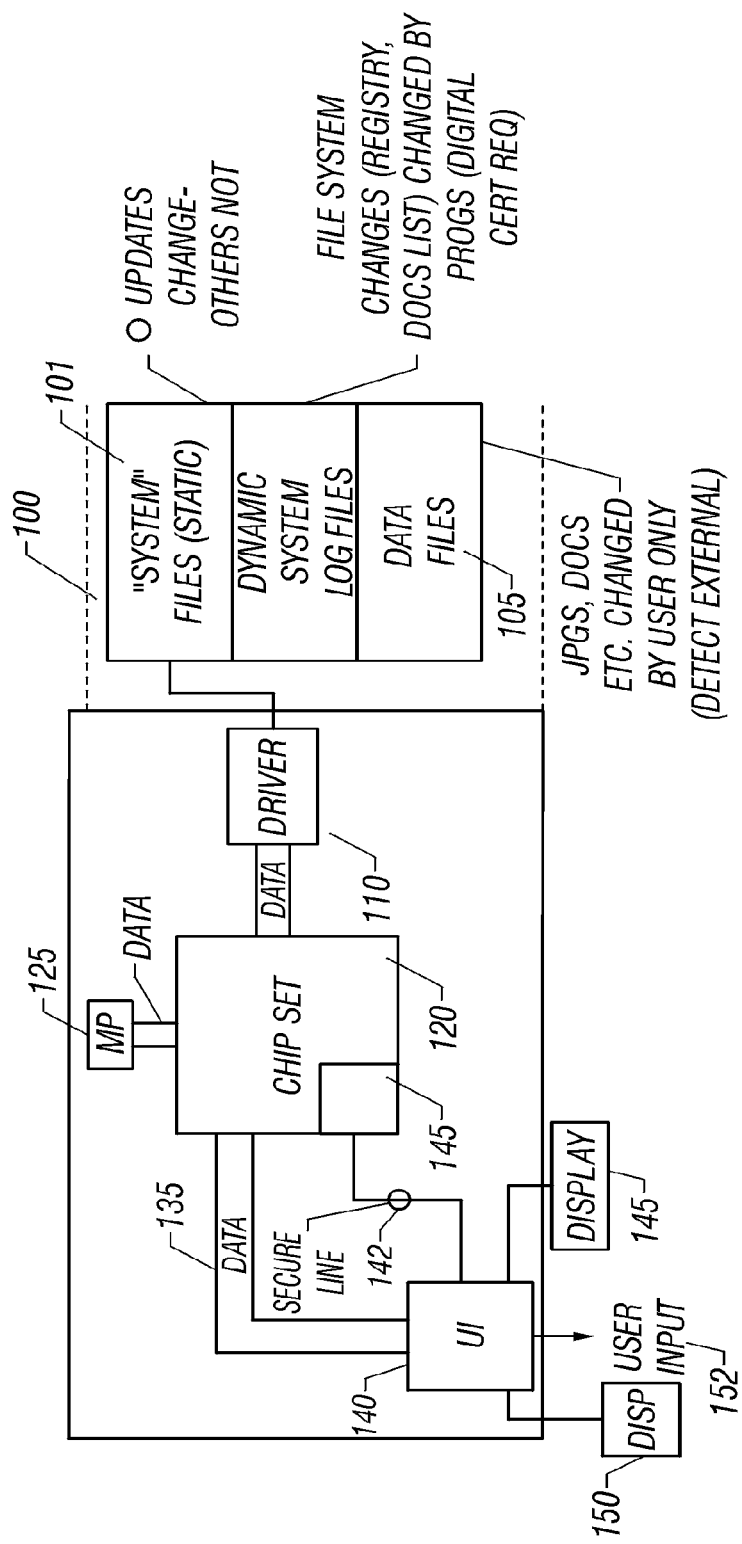
FIG. 1 shows a diagram of a first embodiment which segregates files based on their function.

An embodiment is shown in FIG. 1. This embodiment shows a block diagram of different operative parts of a computer. In the FIG. 1 embodiment, a hardware control system enables control over changing of files.

The file storage is shown as 100. This includes a file storage medium which can be any kind of storage unit, e.g., a hard disk drive or redundant array of independent disks (RAID) drive. Each of the files is stored in a different section. This section can be determined physically, i.e., by specialized areas on the disk, e.g. in different partitions. Alternatively, the areas can be delineated simply by an identifier associated with the file.

As shown, the files are separated into three different kinds of files. A first is the system files 101. These are the files that actually run the computer as part of the operating system. The operating system writes these files, and the files thereafter can only be changed by operating system updates. These files are given an appropriate level of protection, such that only operating system updates can change the files, and other updates cannot change the files. These files are shown as being static system files in the sense that only these operating system updates can change them.

The files shown as 102 are dynamic system files. These are system files that are associated with the operating system, but can be changed by operations which occur. Examples of these dynamic system files are the windows registry, documents list, and file associations. These files can be, and in fact are, changed by installation and operation of programs. Accordingly, these files are handled in a different way.

Finally, data files are shown as 105. These files are user specific files, and are typically changed by the user only. The user may select delete or change these files at any time.

The processing part of the computer includes a driver 110 which controls the file storage 100. The processing part also includes a processor, 125 and user interface, both of which are controlled by a "chipset" 120, which is a controller of associated functions. Chipset 120 also controls the driver. The chipset provides a data bus 135 connected to the user interface module 140. In this embodiment, the user interface module 140 produces a special secure line 142 to a special portion 145 on the chipset. This portion 145 is called a detect external actuation portion. The user interface 145 also connects to the display 150, receives user input 152 and may carry out other functions also.

The secure line 142 can use commercially available techniques, such as a hidden line that is covered with an epoxy ridge, and can also use encryption techniques to avoid spoofing. Basically, the secure line indicates that the user has made some actuation on the user interface. It may also indicate something about the actuation. For example, on a Windows™ keyboard, a secure line may indicate that the user has pressed the windows key. It may also indicate an enter actuation. In operation, this can allow the system to ask the user for their acceptance prior to producing any desired operation. The user's acceptance can be detected over the secure line, thereby preventing a computer program of some sort from spoofing the system.

The different files can be controlled in different ways.

A first mode protects the system files 101 against change by anything other than operating system ("OS") updates. The OS updates may be signed with a digital certificate. In addition, when the operating system is first installed, specified criteria for the digital certificate, such as which manufacturer is allowed to make such a digital certificate, is established. The operating system update is allowed to proceed only if the digital certificate matches the prestored criteria.

In addition, a prompt can be produced, for example, "An operating system update is about to occur. Please signify that you agree by pressing the "Windows" key." Of course, any other key can be selected, but the key which is selected is preferably one which is used only for control and not used during normal entry of data. Depression of the selected key produces a signal on the secured line 142, which is detected by the chipset 120. Hence, operating system updates are only allowed if (1) the digital certificate encryption on the operating system matches a specified characteristic, meaning the sender is a recognized sender, and (2) the user signifies their intent to proceed.

As an additional layer of protection, an internet checking system can be used. For example, if the digital certificate becomes compromised, then others might be able to produce viruses which mimicked the digital certificate. Accordingly, another system, adding an additional layer of protection, checks on the internet to see if the operating system update/digital certificate should still be accepted, or if there are known compromises to the certificate. When the check via Internet option is selected, e.g., by checking the button, the system checks a secured database of information, e.g., one stored by a trusted source, to determine if the update is authorized.

The chipset includes either microcode or hard wired logic that executes the specified operation. In this operation, the driver will produce new commands to override the static system files only when the specified criteria are met. While the above has described both a user actuation and encryption being used, it should be understood that any subset of the above could also be used.

Dynamic system files are changed during operation. For example, the Windows "document list" is frequently changed i.e. whenever a program is started. The Windows registry, however, may be less frequently and more simply used. Different files within this structure have different characteristics and hence different levels of protection. For example, the registry may require protection with encryption or with a manual override. In contrast, dynamic files whose content really does not effect the operation of the operating system, such as the "My Documents" directory, may require no security. The different kinds of files may be set in advance with different preferences for the file. For example, different preferences may be set.

Figure 2:
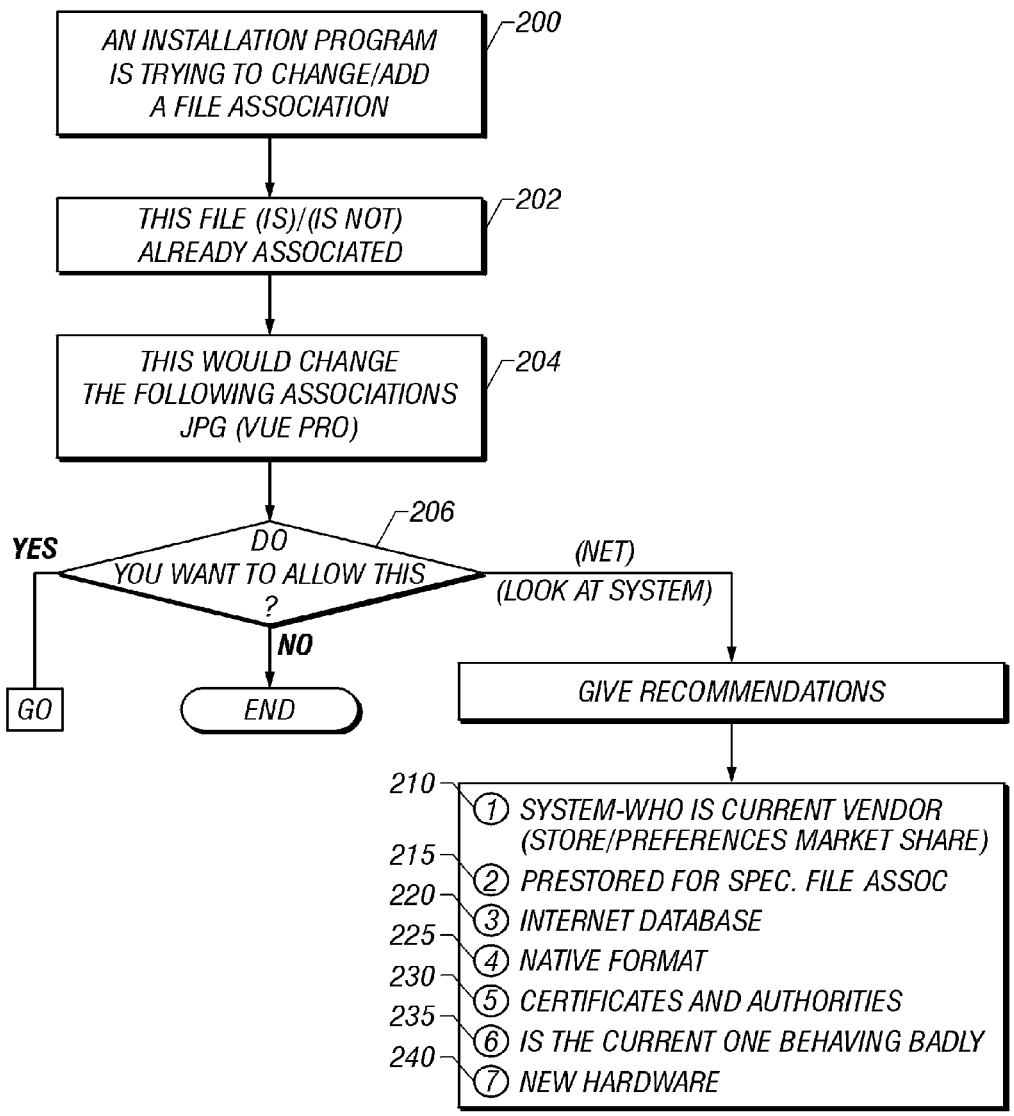
FIG. 2 shows a flowchart of operation.

A common problem is file associations. Many times programs war over which program opens which file. A typical scenario for file associations is shown in FIG. 2. When a program is installed, it carries out various operations. At step 200, it attempts to make a file association. This causes a note to be displayed indicating, "an installation program is trying to change/add a file association." Additional information shown in 202 indicates that the file is/is not already associated. If the file is associated, the additional information shown as 204 is displayed indicating that using the file will change the following association. At 206, the user is given an option of whether they want to allow it. The alternatives are yes, no, and give recommendations at 208. The recommendations at 208 carry out a number of different tests to determine what the proper recommendation should be. At test 210, the system is tested. In this embodiment, manufacturers who have already-installed programs are given higher scores than those who do not. For example, a computer system can have 15 programs installed by Microsoft, and three by Adobe, and one by some secondary manufacturers. A program that came from Adobe, in this example, would have a lower priority than one of Microsoft. However, both of these would have higher priorities than some third-party vendor. The system therefore scores the number of vendors who each have a specified program. Those vendors with a specified program are then given higher priority. In addition, the user is able to override these priorities, and set preferred vendors. For example, the user may have a preferred vendor e.g., a Linux vendor. In that case, the system may also have the capability of allowing a user to set specified preferred vendors.

At 215, the system searches for information that is prestored for specific file associations. For example, a file may have a pre-stored preferred file association. An example is that Microsoft Word may be pre-associated with documents of the .doc type. However, other programs, such as Microsoft Works and others may also be able to use this type, but would be preempted by a later program that is actually the preferred format. At step 220, the system consults an Internet database. Different Internet databases can be used. For example, third party companies such as Symantec may maintain databases of trusted sites. Different websites may also have databases indicating which among a number of different companies is the best site for a specified file format. The user can then select one of those companies as their preferred database. When a problem occurs, the system consults the database to determine which of the multiple programs is recommended for use.

At 225, the system determines if the program being installed has the requested program as its native file format. For example, some programs may be capable of playing a number of different formats such as the Real player which is capable of playing the Real format as well as many other sound formats. However, the Real player's native format is in fact the "Real" format. It scores high on that association; less high on the MP3 association.

At 230, certificates and authorities can also be checked. The certificates indicate whether the system has an authorized certificate or not. The authorities, similarly, can be used to determine whether the system is from an authorized authority.

Another test is made at 235 to determine the way the current program is behaving. For example, the number of crashes of the current program is determined.

At step 240, the system determines if the operation is associated with new hardware which is currently being installed. If so, then the installation is automatically allowed to continue, unless overridden for example. Or, the recommendation is to proceed.

Any of these systems can also be used with any of the other unwanted file writing protection systems.

Each of these options produces a scoring. A tally of all the scores is accumulated. The tally can be used to make a recommendation, or to automatically select an option.

Alternatively, some tests may be binding, and passing that test causes an automatic association.

Figure 3:
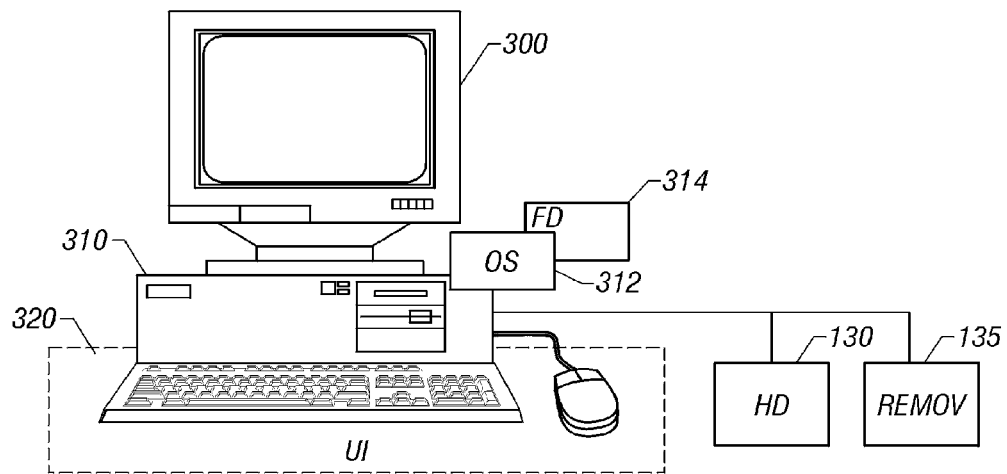
FIG. 3 shows a block diagram of a computer that is usable with this system.

FIG. 3 shows a block diagram of a basic computer system of the type contemplated according to the present invention. The computer system includes a monitor 300, coupled to a computer system 310 which is driven by commands from a user interface 320. The computer system 310 runs an operating system 312 which includes an additional layer 314 shown as a file domain layer (FD). The file domain layer can be part of the operating system, can run under the operating system, or can run over the operating system, e.g., as a layer that is loaded prior to the operating system loading. The operating system, as conventional, controls file access. Therefore, the operating system controls access of the computer 310 to the hard drive 330, and to a removable media 335 which can be a floppy disk, a CD, or any other removable media. Other nonvolatile memory accesses can also be used.

Figure 4:
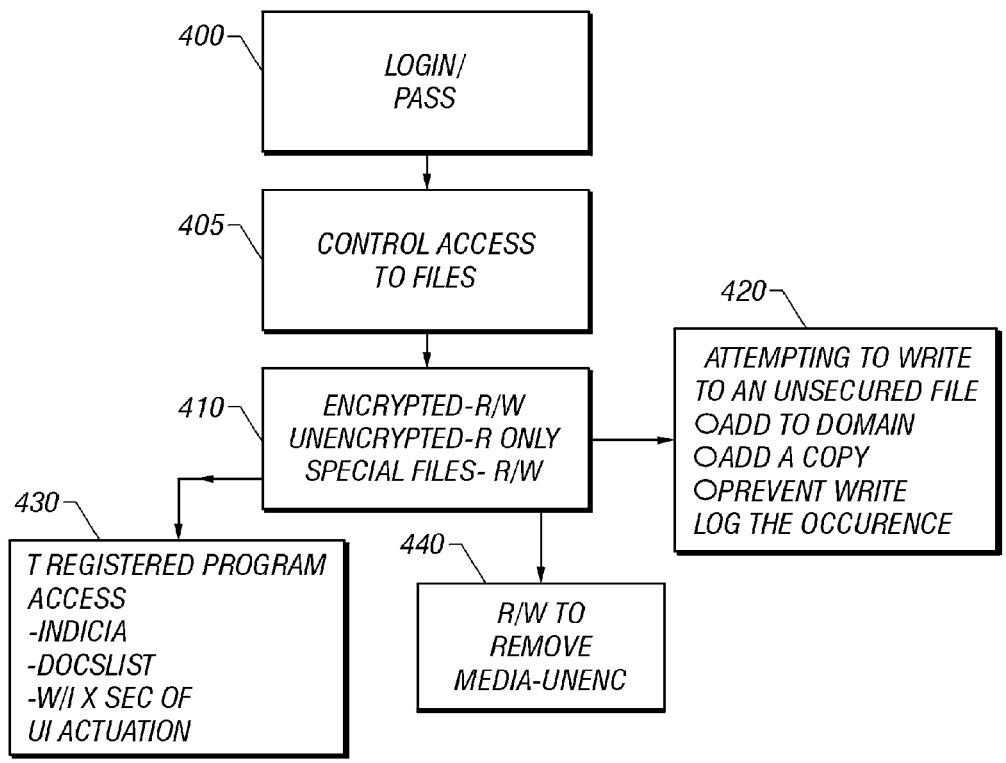
FIG. 4 shows a flowchart of operation of a file domain which protects files against unintentional use.
Figure 5:
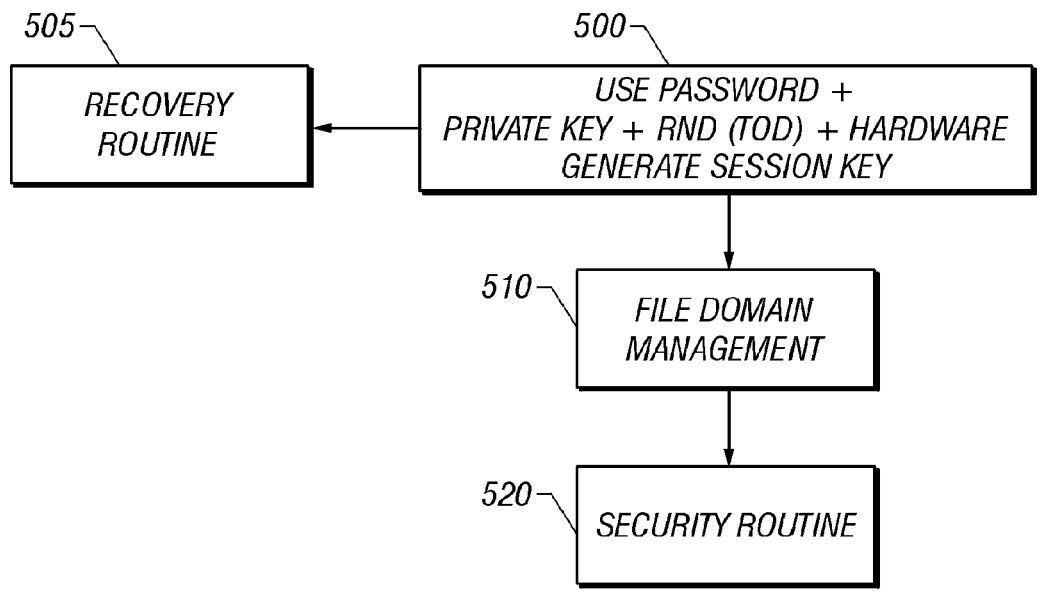
FIG. 5 shows a flowchart of file domain management.

In operation, the process follows the operation of FIG. 4. The user logs in to the computer at 400 in order to obtain access to parts of the computer such as the file system. As part of the login, the user must enter a unique code, e.g., a password or biometric, or smartcard, or digital certificate, or other similar item. If a password is used, the password is preferably known only to the user, and allows the user access to the files. The term password can be thought of as generic to any private information available only to a user. This can include, for example, a personal identification number, an actual password, biometric information, or other personal identifying information. Is biometric information is used, the biometric information can be converted into encryption data, using the techniques described in application Ser. No. 09/577,449.

Once the user has logged into the computer, the operating system controls access of the user to various files on the computer at 405. The operating system controls this access in combination with the file domain layer 314.

Any time that access to a file on the computer is desired, the process operates using the file domain to control the way that access to the files is allowed.

Different file accesses are conventionally controlled by the operating system. For example, a windows system might access FAT and FAT32 files on a first drive, and NTFS files on a second drive, or on a partition of the same drive. This system basically defines another kind of files on a drive. The file domain reads and writes files to the disk, to a partition of the disk, or to just a portion of the disk, using an encryption layer which is described herein. The encryption layer encrypts/decrypts all of the file reads and writes which occur in a certain way, using the unique code. In one embodiment described herein, encryption of all files, except those which qualify for an exception to the encryption, is carried out. The encryption uses the unique code. Only one specified user has access to the unique code, and hence only that one specified user can get access to the files. The encryption of reading and writing can be overridden only by specified actions.

The specific system shown in FIG. 4 allows certain file accesses to be handled in different ways. Unencrypted files can only be read by the file system, i.e., they are read-only, at 410. The system can allow the unencrypted file to become a read/write file. When the file becomes a read write file, it may either be made part of the user's personal file domain, or a copy of the file is made part of the user's file domain. Files within the file domain are encrypted, and can only be read or written by a user who logs in with the proper unique code/password. An alternative is to change security on specified files, allowing those files to become part of the file domain even without encryption. This alternative is less secure; since it allows some files in the file domain to be unencrypted. Those files are preferably specified one by one, and only files which are specified can be handled in that way.

Special file types may be allowed to have read write unencrypted access. For example, word processing documents may be specified for this kind of access. This again provides a security hole, since it allows files to be hidden by making them look like a special file.

In the most preferable mode, however, all read/write files on the computer, which is the bulk of the files, i.e., those which are allowed to be written to by the computer, are encrypted in a special way that requires encryption using the user's password. The encryption preferably requires that the user's unique code be used. Therefore, only the user who logs in with the proper password can read the contents of the encrypted file.

Snooper programs and spyware, and other programs which may write information to the hard drive, may be significantly limited. This system still allows the information to be written to the hard drive, but that information is encrypted in a way such that only the authorized user can read that file.

Many of the operating system files may be designated as read only. In this way, the operating system can be loaded and may run without the encryption layer being loaded. All files which are read-only can be freely read by any process and any user who logs into the computer. This allows the operating system to start. As part of the operating system's operation, of course, there are certain files that need to be read and also written to. Examples of these files include the registry, journals, and the like. Each of these files is intended to be individual to each user who logs on to the computer. Each user who logs on to the computer receives their own individual set of files. Those files are maintained encrypted, and can be read only by that user. If a new user logs on, that new user will receive their own file domain, with their own set of files with which they can interact in an encrypted way.

If a process on the computer attempts to write to an unencrypted file, that is one which is labeled by the file domain as read only, this may indicate a breach in progress. One such breach, for example, would be saving from a keyboard buffer or screen buffer. The system may respond with a warning of the type shown in 420. The warning screen indicates that the computer is attempting to write to an unsecured file. A number of options may be presented. A first option is to copy or move the file to the file domain, in which case the file and all its contents become encrypted. Yet another option is to prevent writing and log the occurrence.

Any time a snooper program surreptitiously attempts to write, the warning screen such as 420 might be shown. If the user elects to make a copy of the file to their file domain, subsequent encrypted writing to that file is also allowed. Any user who logs in as the specified user can also read and write to that file. However, any other user, including the network user and an administrator, can not read or write to that file due to the encryption.

The special files are shown in 430. These are also handled in a special way. A user may want certain files to be unencrypted so that they can be shared. The special files may be read write files which are unencrypted. In this system, for example, a user may designate certain programs such as word processing programs to allow read write access to an unencrypted file. Using the example of Word™, the user may want all files which are acted on by Word to be unencrypted. This leaves, however, a potential security hole, since a snooper program can then act like word, and write all of its information to word files. Another important example is an Internet browser. The Internet browser must be able to produce files and file information that can be sent outside the system. Therefore, certain Internet files must be special unencrypted files. Accordingly, additional security measures can be taken for these special files.

430 shows these additional security measures. One or more of these security measures may be carried out for each of the special types of files. The file may only allow unencrypted access by the registered program, shown here as "registered program access". The file domain layer monitors access to the files, and only allows this access when the native program for the file type is conducting the access. Again, a sufficiently smartly-designed program can fool the OS, e.g., into detecting that word is actually accessing the program when it is not. Another aspect therefore requires the native program, e.g the Word program, to be actually open when file access is carried out.

Another security aspect may require that the files be encrypted when stored, but may allow the user to decrypt the files prior to sending them outside the system. For example, the temporary Internet files on the system may be stored encrypted. Any file that needs to be uploaded, however, may be decrypted prior to upload. Certain security measures may be carried out prior to decryption, to make sure that the upload is actually one which is being initiated by the user, rather than one which is being automated to obtain access to it decryption file.

One additional security measure leaves an indicia of the file writing. For example, the system may write to a log for each file write of a special type that occurs. This enables either the system or the user to later monitor that file write log to determine if some program is attempting to masquerade as the native program. The log can include information about the program that made the accesses, such as program name and the like. In addition, the program is only allowed to operate when the document is placed in the edited documents list. Again, the user can therefore easily see if writing has been carried out to documents which the user has not been using.

Another aspect may allow writing within a certain time, e.g. 5 seconds after a user interface actuation. Other security measures can also be carried out. Each of these security measures is calculated to attempt to prevent a program from surreptitiously obtaining write access to a file which could later be viewed by another user.

Another form of unencrypted file write is to the removable media shown here as 335. There is much less of a security risk from writing to a removable media, since the user will not typically leave media in the removable drive long enough to cause it to be a security risk. In addition, on shutdown, the system can warn that the user should remove any removable media from the drive in order to further minimize this risk. Therefore, one other way of forming an unencrypted read/write file is to send the file to the removable media shown as 440.

A file can be made into a special file by right clicking on the file, and changing its properties to a shared file. The shared file is a special file having the characteristics of the special file shown in 430. The layer maintains file security in this embodiment, and allows each file to be separately designated as having different characteristics.

A specific kind of snooper program is described herein which may be specifically advantageous as a snooper program, and may be specifically difficult for any system, even the presently-described file domain system, to detect. The snooper program is started with the operating system, using a registry key which causes the program to stay within memory. The program carries out its operations, and maintains its results in either a swap file, a page file, or in RAM. These results can be, for example, screenshots. This much may be conventional in snooper programs. Any time that a program opens a native document, which may include any document of a word processing type, or even an Internet document, the snooper program detects this opening. The information in the results is then stored as part of the open document, e.g., as a hidden comment, or steganographically stored within the open document. A log file maintains information about where the results were stored.

This may fool even this system, since the information is present in documents which are opened by their native application. The log file may be stored encrypted, and may be difficult to find. However, the snooper program may still have a way of detecting which native files were access by the snooper program when desired access to the file by an administrator is desired. Full security-that is security which encrypts all files, will defeat this system. The presence of special files, however, may make it possible for this kind of system to provide a desired information about a system.

In operation, the file domain layer may operate as part of the operating system, or associated with the operating system. The layer may be a file called by the operating system that started. Alternatively, the layer may run below the operating system, called by the system bios. In any case, the layer carries out these basic operations described herein. At 500, system uses the user password in combination with a private key which is stored on the computer plus a random number which may be a time and day stamp, plus a hardware-based key. The hardware based key may be for example a bios serial number or processor serial number for example. Each of these numbers are concatenated together to generate an encryption key. The key is used for the encryption and decryption of files. The key may be a session key which is unique since it includes information from the random number. However, the random number information is also encrypted as part of each file write, so that the corresponding random number information can be used to generate the file reading key during the next session. The user's unique information becomes an indispensable part of the session key. The key cannot be formed without the user password, and therefore without the user password, encrypted files cannot be read or written. In addition, by using the hardware key, these encrypted files which are stored on the internal drive, cannot later be read on another computer. The hardware key may be considered as optional, and a somewhat less secure system can be used by simply getting together the user's private key and password to generate the session key. All of these techniques are well-known in cryptographic science, and are not described in detail herein.

During an initial set up of the system, the system may also generate a recovery routine. The recovery routine can be used when there is a catastrophic failure, for example a system crash, or a death or illness of the user. This may provide a backdoor entry into the encrypted file system. The user may generate the recovery routine special key, and stored on a disk in a safe location. In this way, the user can direct another to obtain access to his files without actually giving up the password.

After generating the key at 500, the user obtains access to the file domain. Again, this file domain has access to all read-only files everywhere in the system, all of which are unencrypted. The file domain may also have restricted access to special file types as described above. In addition, the file domain has access to read write unencrypted files that are within the file domain. The file domain also, as described above, allows certain files to be copied as encrypted read/write files into the file domain. The file system maintains a list of those files which have been copied to make them editable. Any attempt to write to one of the files which has been copied in this way is translated into a request to write to the copy. The file domain management, shown as 310, includes all of these operations described above.

This system describes using encryption to protect against privacy intrusions and other operations which can be carried out without the user knowing it. However, other techniques can be carried out within the computer for enhancing the security of files within a file domain.

At any time during the operation, the user may run the security routine 520 which operates to further enhance system security. The security routine may display a list of documents which have been accessed as a read write file. This may allow the user to determine if any of these documents have been accessed by a program other than those that the user has designated.

In addition, the security routine may be updated with information about undesired programs; e.g., snoopers and Spyware. This information can describe techniques used by snooper programs to store information into a file. The security routine can analyze file accesses to determine if any of them are likely to be accesses by snooper programs and report on that.

While the above has described monitoring file access for prevention of snooper programs, it should be understood that this monitoring the file access can also be used for other reasons. For example, many different flavors of viruses and worms may actually change the user's programs on the computer. This system makes certain files as read only, and therefore may prevent a virus from making these changes. Moreover, by encrypting the files, the virus may not be able to operate in the way that it was designed since it does not obtain native access to the files; it only obtains access to an encrypted version of the file.

In addition, the security routine at 520 can analyze file accesses, and may also be programmed with virus information to monitor the viruses.

In summary, the above embodiment may prevent a snooper program from operating properly. Even if the snooper programs actually does the snooping and writing, it may carry out its writing only in encrypted form that cannot be read by someone who does not have the user password.

The system described above protects the file domain through encryption. However, it may be possible to protect the files in the file domain in other ways. For example, a firewall may be erected in the computer to protect certain files from being read. The firewall prevents files that are within the file domain from being read from outside the firewall. The user's password may be necessary to have access to the firewall. This can also protect specified files within the computer from being read externally.

Figure 6:
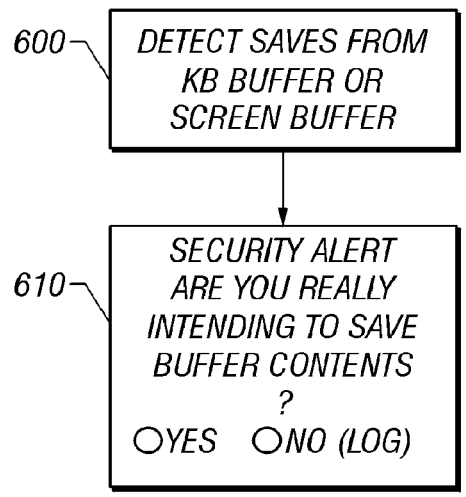
FIG. 6 shows a flowchart of detecting a specific kind of breach.

Another embodiment, shown in FIG. 6, may also guard against snooper operations. In this embodiment, usable without the file domain encryption described above, the file domain system monitors all states and/or operations. Any states, which include saving contents of the screen buffer or keyboard buffer, are specifically monitored. In certain circumstances, such as screen shots, and printing to PDFs for example, it may be desirable to actually print from these buffers. However, other operations such as screen shots might be simply attempts to improperly obtain information. Accordingly, each time a save is carried out which is based on information in this way, a security alert may be displayed. The security alert queries, for example, "are you really intending to save buffer contents?" If the user is for example attempting to do a screen shot, than the user will of course say yes. If not, the user may say no, and log the incident to attempt to find the program later that is carrying out the save. This system may also include a security routine, and the contents of the log are used by the security routine to attempt to find additional information about the program.

Other embodiments are contemplated.

The invention claimed is:

1. A method, comprising:
   defining a file association between a kind of file on an operating system, and a first program which normally opens said file, and where said file association is stored in a list that defines which program normally opens said file;
   detecting an operation whereby another file attempts to change said file association such that after said change, said file association would specify a different program, other than said first program would open said file;
   providing a recommendation to a user of whether the user should change said file association to specify that said different program to open said file.

2. The method of claim 1, wherein said recommendation comprises carrying out plural different tests to determine which of a plurality of programs is the best program to open the file.

3. The method of claim 1, wherein said recommendation is based on a company who first established said kind of file as a native file format.

4. The method of claim 1, further comprising establishing a priority between programs and determining which program should open said file based on said priority.

5. The method of claim 1, further comprising allowing the user to determine whether the file association should be changed.

6. The method of claim 1, wherein said providing a recommendation comprises consulting an Internet database that includes information about programs and file formats.

7. The method of claim 1, wherein said providing a recommendation comprises determining if said recommendation is based on new hardware being added, and providing priority if said recommendation is based on new product new hardware being added.

8. The method of claim 1, wherein said providing a recommendation comprises monitoring a number of times a specified program has crashed, and making a recommendation which minimizes the number of crashes.

9. A method, comprising:
   defining an association between a file on a computer, and a file-associated program that is normally used to open the file;
   using an operating system running on the computer, and detecting whether a program that is attempting to open said file is actually said file-associated program, or is another program which is masquerading as said file-associated program;
   allowing the file associated program to open the file; and preventing the masquerading program from opening the file.

10. The method of claim 9, wherein said detecting comprises detecting an actual instance of a native program that is natively used to open said file.

11. The method of claim 9, wherein said detecting comprises determining a time since a user interface actuation, and preventing access if the time is greater than a specified amount.

12. A method, comprising:
- in an operating system, monitoring access to files by a first program;
- in said operating system, designating a first set of files as being individual to a specific user of said first program;
- encrypting and decrypting said first set of programs in order to allow use of said first set of programs,
- said monitoring operating for determining if said first program is attempting to obtain access to another file which has not been encrypted by said encrypting and is an unencrypted file, and where said another file is a file other than said first set of files; and
- requesting a confirmation from a user of the computer prior to allowing said first program to obtain said access to said another file that is not specific to the specific user.

13. The method of claim 12, wherein said confirmation is a security alert that queries whether the user is really attempting to save contents of a buffer.

14. A method as in claim 12, wherein said operating system prevents said writing to another file without said confirmation.

* * * * *